United States Patent [19]

Pedersen

[11] Patent Number: 5,862,348
[45] Date of Patent: Jan. 19, 1999

[54] METHOD AND APPARATUS FOR CONNECTING A CLIENT NODE TO A SERVER NODE BASED ON LOAD LEVELS

[75] Inventor: Bradley J. Pedersen, Coral Springs, Fla.

[73] Assignee: Citrix Systems, Inc., Fort Lauderdale, Fla.

[21] Appl. No.: 598,800

[22] Filed: Feb. 9, 1996

[51] Int. Cl.⁶ .............................. G06F 13/38; G06F 15/17
[52] U.S. Cl. ............................... 395/200.59; 395/200.56; 395/200.72
[58] Field of Search ..................... 395/200.06, 200.12, 395/182.02, 200.38, 200.39, 200.4, 200.41, 800.31, 200.59, 200.33, 200.72, 200.56; 364/132, 230.4, 942.4, 931.44

[56] References Cited

U.S. PATENT DOCUMENTS

| | | | |
|---|---|---|---|
| 4,387,425 | 6/1983 | El-Gohary | 395/200.83 |
| 5,031,089 | 7/1991 | Liu et al. | 364/DIG. 1 |
| 5,249,290 | 9/1993 | Heizer | 395/650 |
| 5,461,608 | 10/1995 | Yoshiyama | 370/16.1 |
| 5,473,599 | 12/1995 | Li et al. | 395/182.11 |
| 5,526,492 | 6/1996 | Ishida | 395/200.09 |
| 5,644,720 | 7/1997 | Boll et al. | 395/200.12 |

FOREIGN PATENT DOCUMENTS

| | | |
|---|---|---|
| 0384339 | 8/1990 | European Pat. Off. . |
| 0540151 | 5/1993 | European Pat. Off. . |
| 0648038 | 4/1995 | European Pat. Off. . |
| 0715257 | 6/1996 | European Pat. Off. . |
| 06332782 | 12/1994 | Japan . |

OTHER PUBLICATIONS

"OS/2 EE Database manager SQLJRA Remote Control", *IBM Technical Disclosure Bulletin*, vol. 36, No. 1, pp. 33–36 Jan., 1993.

Mann, Bruce E. et al., "Terminal Servers on Ethernet Local Area Networks," Digital Technical Journal No. 3, pp. 73–87 (Sep. 1986).

*Windows NT Networking Guide: Microsoft Windows NT Resource Kit*, pp. 79–87, Microsoft Press 1995.

Abstract of Schemers, R.J., III, "Ibnamed: a load balancing name server in Perl," published by USENIX Assoc. in *Proceedings of the 9th USENIX Systems Administration Conference*, pp. 1–11,Berkeley, CA, 1995.

Schemers, R.J., III, "Ibnamed: a load balancing name server written in Perl—Update," available at http.//www–leland-.stanford.edu/~schemers/docs/Ibnamed/Ibnamed.html, pp. 1–5, Sep. 17, 1995.

*Primary Examiner*—Mark H. Rinehart
*Attorney, Agent, or Firm*—Testa, Hurwitz & Thibeault, LLP

[57] ABSTRACT

A network including at least two server nodes, a master network information server node and a client node in communication with each other. The master network information server node contains a list of network addresses and respective load information corresponding to each of the server nodes. In one embodiment the client node is directed to use a server node on which to execute an application based on the load information stored on the master network information server node. A method is described which includes the steps of requesting an available servers from a master network information server node and connecting the client node to an available server node based on the load levels.

16 Claims, 6 Drawing Sheets

METHOD AND APPARATUS FOR CONNECTING A CLIENT NODE TO A SERVER NODE BASED ON LOAD LEVELS

FIELD OF THE INVENTION

The invention relates generally to a method and apparatus for computer to computer communication and more specifically for communication between a client node and a server node over a communication network.

BACKGROUND OF THE INVENTION

Computer communication networks typically include one or more computer nodes termed servers and one or more computer nodes termed clients. A server provides a service to a client upon receiving a request from the client. An example of a typical service provided by a server is that provided by a file server.

A file server is a computer node having data storage capabilities. Data files which are to be accessed by users on various client nodes are stored on the file server. When a client node needs a file, a request is transmitted to the file server node which obtains the file from its local storage and transmits the file to the requesting client node. When the client node has completed its use of the file, the client node returns the updated file to the file server for storage. By using a file server rather than keeping files on local storage on the client node, the amount of local storage is reduced, the ability to backup or copy the file periodically is improved, and access to the file by multiple users is improved.

Many other types of servers are known. For example, print servers control the printing of documents for client nodes. By using a print server, each computer need not have a printer, thereby reducing the number of printers needed to support the number of computers on the network. Application servers provide application programs for clients, thereby avoiding the need of maintaining an application on each client. Application execution servers not only provide applications for the client nodes, but also execute the applications and thereby act as "compute engines" for the client nodes.

One issue that arises is that of apportioning the client requests to each server node which is capable of answering the requests. For example, if two application execution server nodes are both capable of executing an application for a client node, but one application execution server node is presently executing the application for three other clients and the other application server is not executing the application for any client, then what is desired is a means for sending any new requests for the execution of the application to the under-utilized server. This balancing of the work load among the various network servers is referred to as load leveling.

One prior art system which is capable of performing a rudimentary form of load leveling is the VAXcluster™ computer system of the Digital Equipment Corporation (Maynard, Mass.). A VAXcluster™ is a group of VAX™ computers connected together by a communication link. A user on a local area network connected to the VAXcluster™ can access different computers of the VAXcluster™ according to the load level of the various nodes. However, this is form of load leveling is more akin to a user selecting a different client node than it is selecting a server node in a present day network.

What is desired then is a method for permitting a client node to select the least loaded server node without user intervention. The present invention permits such functionality.

SUMMARY OF THE INVENTION

The invention relates to a network including at least one server node, a network information server node and a client node in communication with each other. The network information server node includes a list of network addresses and load information corresponding to each the server nodes. In one embodiment the client node is directed to a server node on which to execute an application based on the list of available servers and corresponding load levels as determined by the network information server node. In one embodiment the network information server node is a separate node from the other server nodes. In another embodiment the master network information server node is also an application execution server node. In yet another embodiment the network comprises at least two network information server nodes, one of the network information server nodes being elected the master network information server node. In another embodiment the application execution server nodes are grouped into clusters.

The invention also relates to a method for connecting a client node to a server node. In one embodiment, the method includes the steps of requesting an available service and being directed to a server based upon the load levels as determined by a network information server node.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE INVENTION

Figure 1:
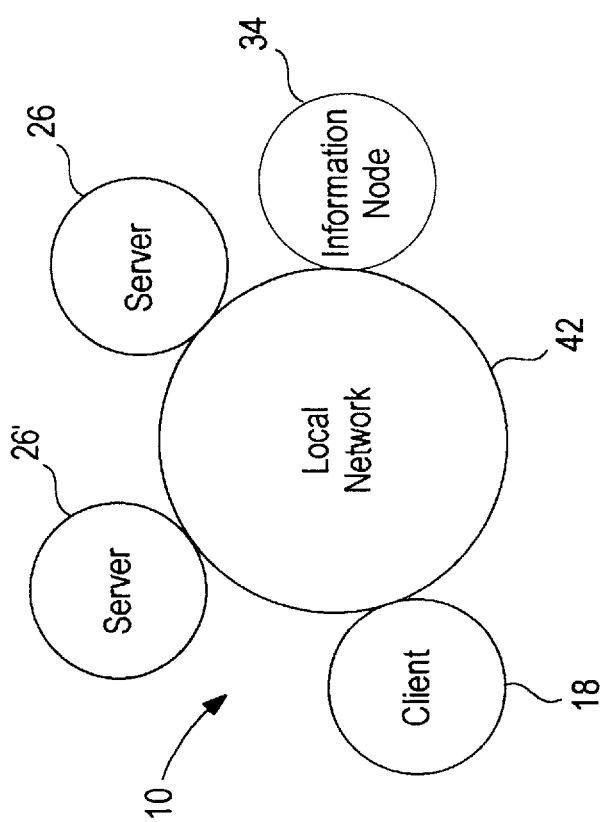
FIG. 1 is a diagram of an embodiment of a local network on which the invention is practiced.

In brief overview, and referring to FIG. 1, a typical network 10 includes a client node 18, two server nodes 26, 26', and a master network information server node 34 connected together by a communications link 42. The embodiment shown in FIG. 1 depicts the communications link 42 as a local area network or LAN, but any communication topology may be used. For the purpose of simplification, the two server nodes 26, 26' are both capable of servicing a request from the client node 18. Also for the purpose of simplification the master network information server node 34 is assumed to be a distinct server node, but in actuality the master network information server node 34 may be an application execution server node 26, 26'. On a given LAN several nodes may be capable of acting as a network information server node, but only one of such nodes is designated the master network information server node and it is to this node that client requests for server information are directed.

The master network information server node 34 maintains a table of addresses for the application execution server nodes 26, 26'. In addition, the master network information server node 34 receives messages from the application execution server nodes 26, 26' indicating their level of activity. The level of activity of the application execution server nodes 26, 26' is maintained in a table along with the address of each of the application execution server nodes 26, 26'.

When a client 18 wishes to have an application executed on an application execution server node 26, 26', the client node 18 sends a request to the master network information server node 34. The master network information server node 34 accesses the table of server addresses and returns a message containing the address of the application execution server 26, 26' with the least load. The client node 18 then requests service from this least loaded application execution server node 26, 26'.

Figure 2:
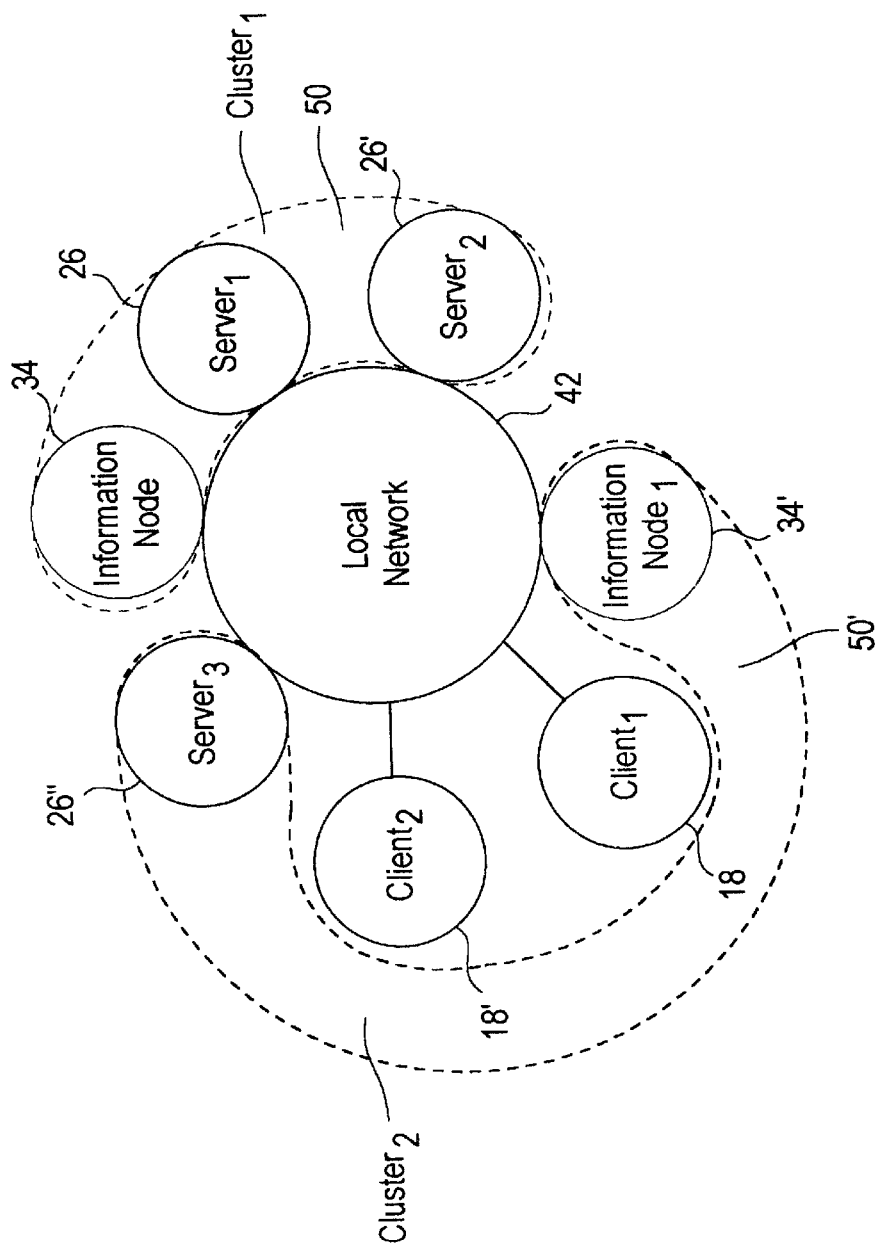
FIG. 2 is a diagram of an embodiment of a local network on which the invention is practiced, with the application execution servers grouped into clusters.

Referring to FIG. 2, the application execution servers 26, 26', 26" and the master network information servers 34, 34' may be grouped into clusters 50, 50'. A cluster 50, 50' is defined as a group of application execution servers 26, 26', 26" with similar capabilities. For example, each application execution server 26, 26', 26" in a cluster 50, 50' is capable of executing a given application. The cluster 50, 50' is named and is accessed by a client 18, by using the cluster name. The cluster name can be the name of an application common to all members of the cluster 50, 50'. A given application execution server 26, 26', 26" can belong to more than one cluster 50, 50'. Thus, if application execution server 26 is capable of executing applications A and B, server 26' is capable of executing applications B and C and server 26" is capable of executing applications A and C, then cluster A would include servers 26 and 26", cluster B would include servers 26 and 26' and cluster C would include servers 26' and 26". All client nodes 18, application execution server nodes 26, 26', 26" and master network information nodes 34, 34' which communicate do so using the same network transport layer communication protocol.

Therefore, if the client node 18, the application server nodes 26, 26' and master network information server node 34 communicate among themselves, the client 18, the servers 26, 26' of the cluster 50 and the master network information server 34 would communicate using the same protocol, for example TCP-IP. Similarly if client 18', the server node 26" and the master network information server node 34' of cluster 50' communicate using a different protocol, for example IPX, then only client nodes using IPX can communicate with the server 26" and the master network information server node 34'. Thus there must be a master network information server node 34 for every network protocol used.

Figure 3:
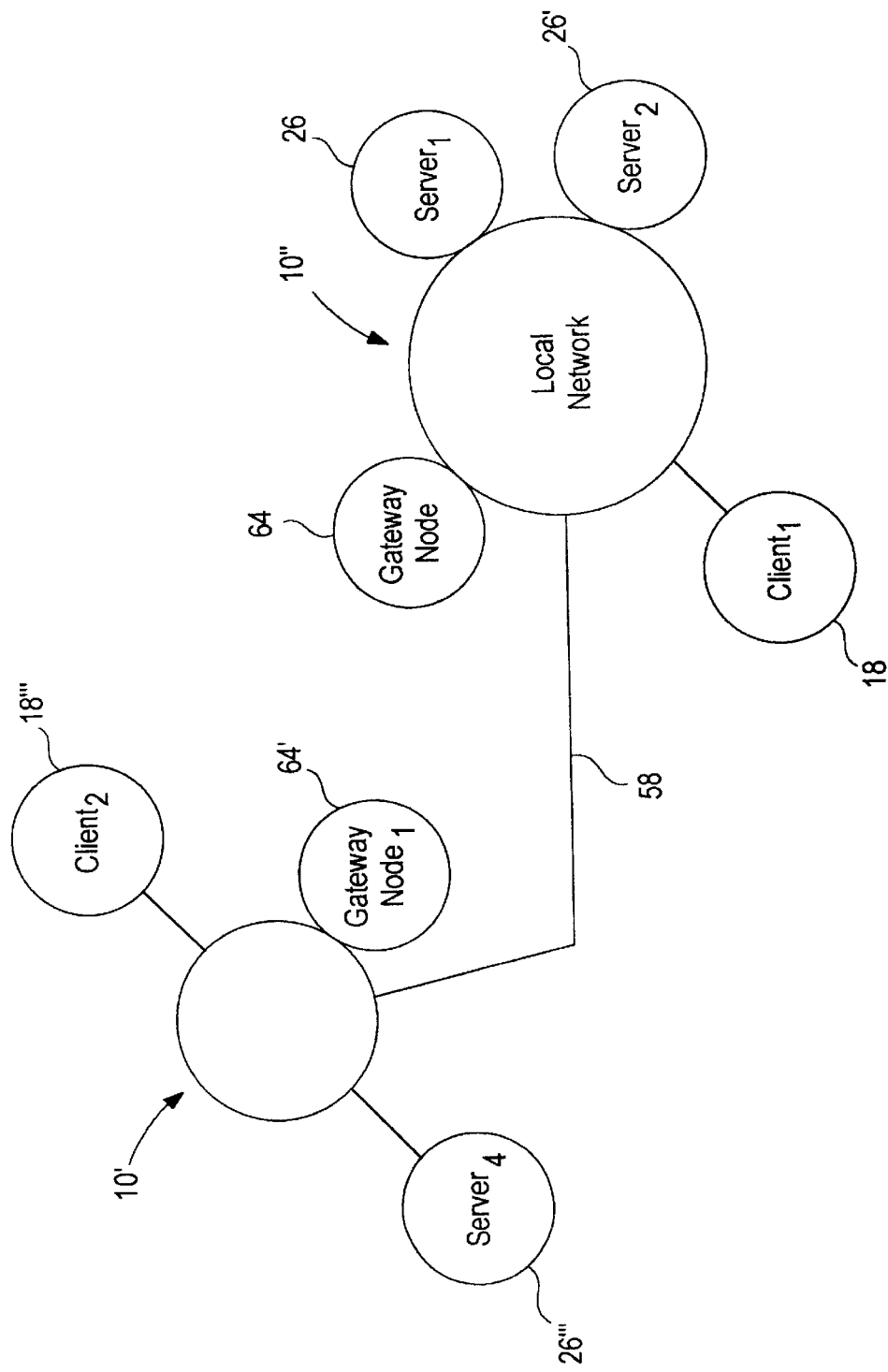
FIG. 3 is a diagram of an embodiment of a wide area network on which the invention is practiced.

Referring to FIG. 3, the system of the invention can also be used in the context of a Wide Area Network (WAN). In the embodiment of the WAN shown in FIG. 3, two local area networks 10', 10" are connected by a WAN communication link 58. Each LAN 10', 10" may include a client node 18, 18'" and/or one or more application execution server nodes 26, 26', 26", 26'". In addition each LAN may include one or more gateway nodes 64, 64'. A gateway node is a node on one LAN which maintains the address of at least one node on a remote LAN.

When there is a gateway node 64, 64' on the LAN 10, 10', that gateway node 64, 64' is also the master network information server node 34 for the LAN 10", 10', respectively. The master network information server node 64 does not have any information about the application execution servers 26'" located on the remote network 10'. All the master network information server node 64 has information about is the corresponding master network information server node 64' on the remote network 10', and the master network information server node 64 communicates with its counterpart 64' on the remote network 10' to obtain information about the application execution servers 26'" located on the remote network 10'. Thus, a master network information server node 64 configured as a gateway node maintains the address of the corresponding remote master network information server node 64'. As such, the master network information node 64 configured as a gateway node to remote network 10' maintains the addresses of the remote master network information server nodes 64'.

Referring again to FIG. 1, It is desirable to dynamically select a master network information server node 34 from the available nodes on the network. In this way, if the master network information server node 34 fails, a new master network information server node 34 may be selected as soon as the failure of the previous master network information server node 34 is detected. In one embodiment a master network information server node 34 is selected by an election process among the servers 26. Note that if the master network information server node 34 changes because of an election, the gateway node will change to the new master network information server 34.

In one embodiment, any node (client 18, server 26, or network information server 24) may force an election at any time by broadcasting a request election datagram on the LAN 10. The election results are determined by a comparison of the set of election criteria which is transmitted within the request election datagram transmitted by the requesting node with the set of election criteria maintained on each receiving node. That is, the first election criterion from the datagram of the requesting node is compared by the receiving node to the first criterion of the receiving node. The highest ranking of the two criteria being compared wins the comparison and the node with that criterion wins the election. If the two criteria tie, then the next criteria are sequentially compared until the tie is broken. If server node 26 receiving the request election datagram has a higher election criteria than that received in the request election datagram, the node receiving the request election datagram issues its own request election datagram. If the receiving node has a lower election criteria than the criteria received in the request election datagram, the receiving node determines it is not the master network information server node and attempts to determine which node on the network is the master network information server node.

In one embodiment the criteria which determine the outcome of the election include: whether or not the node is statically configured as a master network information server node; whether the node has the higher master network information server software version number; whether the node is an NT domain controller (The domain controller is a server which maintains the master user database for the network. Because this controller has high availability it is a good selection for the network information server.); whether the node is the longest running node; and whether the node has a lexically lower network name. In one embodiment, the datagram structure for the election request includes an unsigned shortword for the server version number, an unsigned shortword in which the bits are flags which designate whether the node is statically configured as a master network information server node, or is executing on a NT domain controller and an unsigned longword containing the amount of time the server has been running.

Periodically, the master network information server node 34 transmits a declare message to the other nodes on the LAN declaring itself to be the master network information server node 34. If another node believes itself to be a master network information server node 34 for the cluster 50, the other node will request an election. In this way erroneous master network information server nodes 34 of the same protocol are detected and removed. In addition an election will also be requested: by any node when that node reboots; by any server node to whom the master network information server node has failed to acknowledge an update message; or any client node to whom the master network information server node has failed to respond to a request for information.

Figure 4:
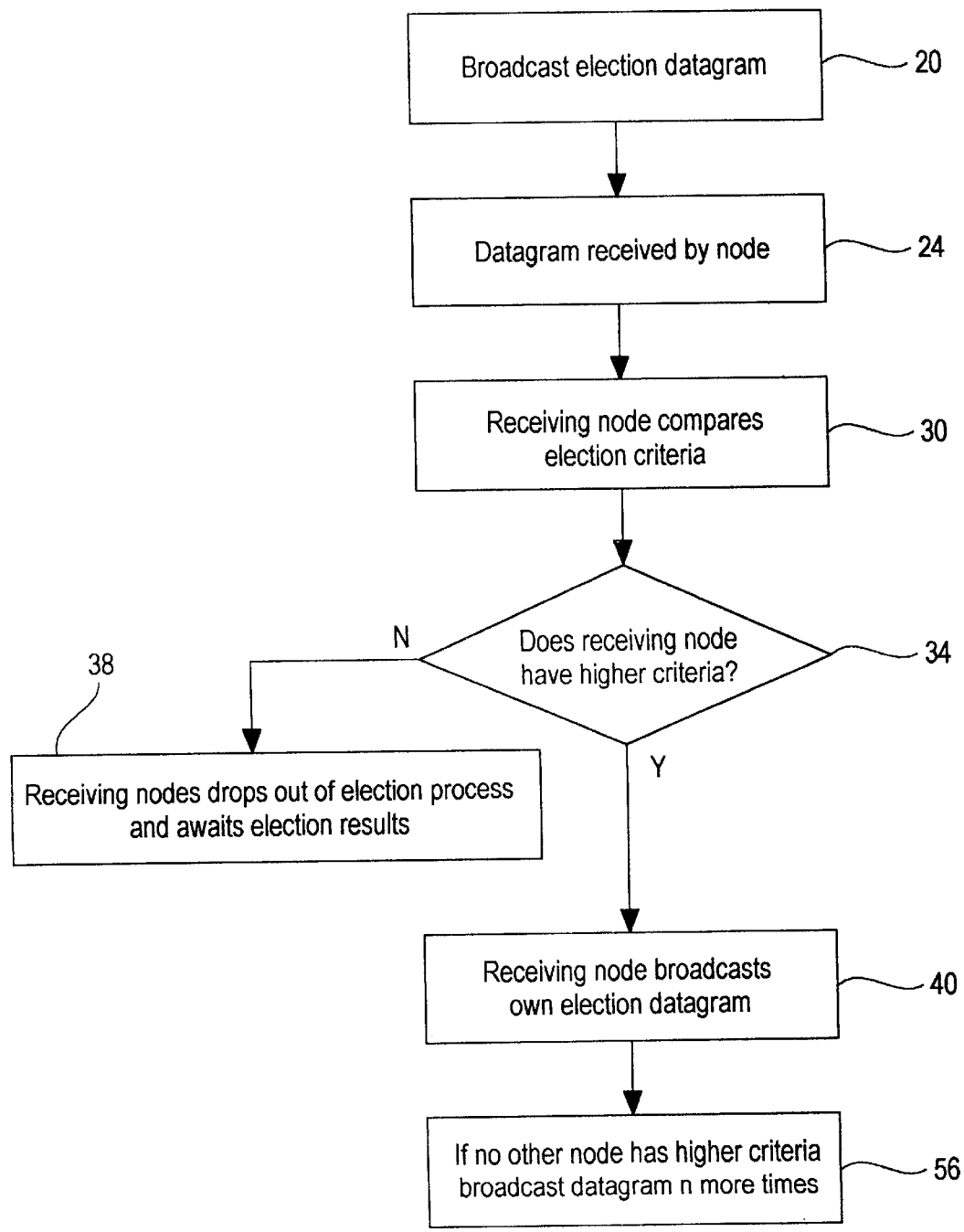
FIG. 4 is a flowchart representation of an embodiment of a process for electing a master network information server node.

In more detail and referring to FIG. 4, once any node broadcasts a request election datagram requesting an election (Step 20), the node receiving the request election datagram (Step 24) first compares its election criteria to the criteria in the request election datagram (Step 30) to determine if the receiving node has higher criteria (Step 34). If the node receiving the datagram has lower election criteria (Step 38) than the criteria contained in the request election datagram, the node receiving the request election datagram drops out of the election process and awaits the results of the election (Step 38).

If the node receiving the request election datagram has higher election criteria than that contained in the request election datagram, then the node receiving the request election datagram broadcasts its own request election datagram containing the nodes own election criteria (Step 40). If in response to the transmission of the request election datagram by the second node, another node responds with a request election datagram with even higher election criteria, then the second node drops out of the election and the node with higher criteria broadcasts it's own request election datagram. If no other node responds with higher election criteria, the node which has apparently won the election for master network information server node sends n more election requests, (in one embodiment three requests) (Step 56) and then if still no other node responds with higher election criteria, the node which has sent the n election requests is the new master network information server node.

After the election has occurred and the new network information server 34 has been determined, all the server nodes 26, 26', 26" send all of their configured gateway addresses to the new network information server node 34. In this way the new network information server node 34 becomes a gateway node.

Referring again to FIG. 1, once the master network information server node 34 is elected, the application execution server nodes 26, 26', 26" send update datagrams to the master network information server node 34 providing information about each server node 26, 26', 26" transmitting the update datagram. In one embodiment, the update datagram sent to the master network information server node 34 from a server node 26, 26', 26" includes: the server name; the network address; the cluster name; the network transport protocol; the total number of nodes configured with this transport; the number of ports available for connection with a client using this transport protocol; the total number of users permitted to be active at one time; number of available user slots; and server load level. Upon receipt of the update datagram, the master network information server node 34 returns an acknowledgment to the server node 26, 26', 26" which transmitted the update datagram indicating that the update datagram was received. If the server node 26, 26', 26" transmitting the update datagram does not receive an acknowledgment from the master network information server node 34, the transmitting server node 26, 26', 26" assumes that the master network information server node 34 has failed and transmits an election request.

Figure 5:
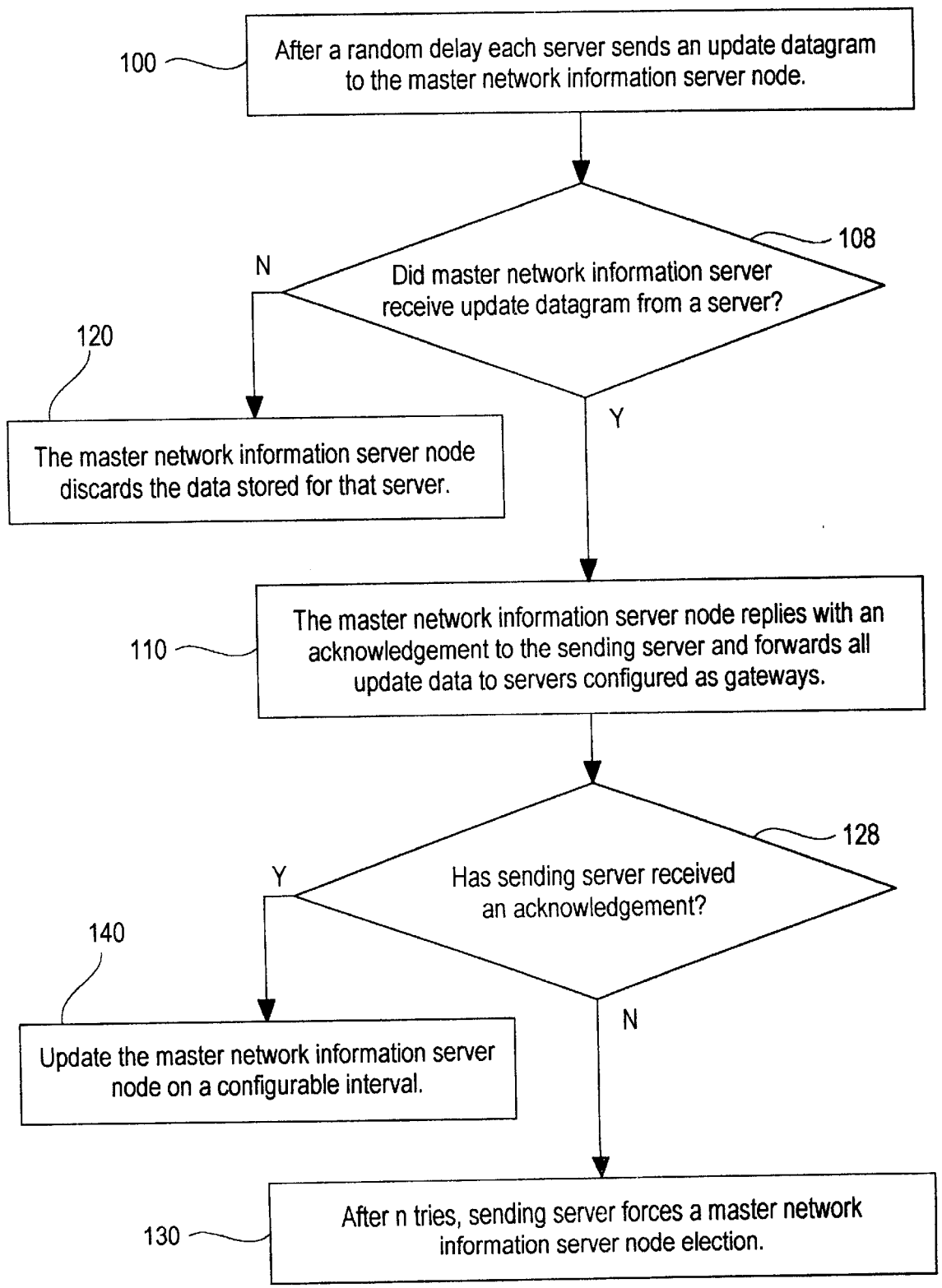
FIG. 5 is a flowchart representation of an embodiment of a process by which servers update the master network information server node.

In more detail and referring to FIG. 5, a server node 26, 26', 26", after the election of a master network information server node 34, waits a random period of time and then sends a datagram to the master network information server node 34 with its latest load information (Step 100). In one embodiment the delay is between four and six seconds. If the master network information server node 34 receives (Step 108) an update datagram from a server node 26, 26', 26", then the master network information server node 34 replies to the transmitting node with an acknowledgment (Step 110) and forwards the data to any node configured as a gateway node. If the master network information server 34 fails to receive data from a server 26, 26', 26" (Step 108), then the master network information server 34 discards the old data from the server node 26, 26', 26" after a predetermined amount of time (Step 120).

If the server 26, 26', 26" node does not receive an acknowledgment from the master network information server node 34 after the server 26, 26', 26" has sent an update datagram (Step 128), the server 26, 26', 26" retransmits the update datagram. The server 26, 26', 26" will attempt n retransmits (in one embodiment three) before it assumes that the master network information server 34 has failed and then transmits an election request (Step 130). If the server node receives an acknowledgment, then it periodically updates the master network information server node, in one embodiment every 5 to 60 minutes (Step 140).

Figure 6:
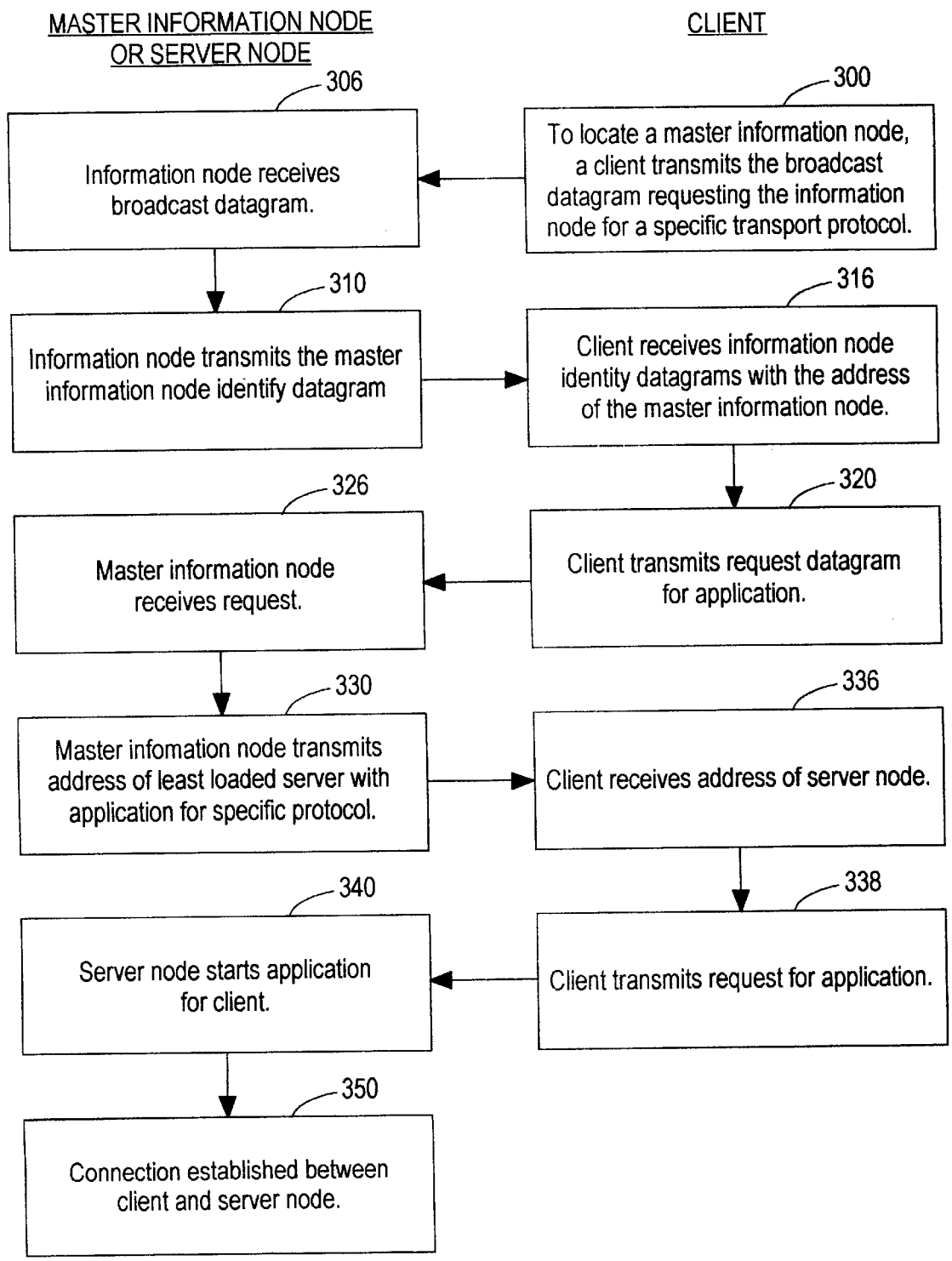
FIG. 6 is a flowchart representation of a request by a client to an embodiment for making a master network information server node and a server node.

Once the master network information server node 34 has established a database of information relating to the server nodes 26, 26', a client 18 may request information about the servers 26, 26'. Referring to FIG. 6, the client node 18 first determines which node is the master network information server node 34. To do so, the client node 18 broadcasts a datagram to all server nodes asking which node is the master network information server node 34 for the transport protocol used by the client 18 (Step 300). Upon receipt by a network information server node 34 (Step 306), the network information server node 34 transmits the identity of the master network information server node to the client node 18 by datagram (Step 310). The client node 18 then receives the identity datagram from the network information server nodes 34 (Step 316) and using the address provided requests information regarding the servers on the network regarding the application desired by the client 34 (Step 320). The master network information server node 34 receives the request (Step 326) and transmits the address of the least loaded server node 26, 26' to the requesting client 18 (Step 330). The client 18 receiving the address of the least loaded server node 26, 26' (Step 336), transmits a request to the server node 26, 26' (Step 338), which starts the application (Step 340) and establishes a connection with the client 18 (Step 350).

Having described preferred embodiments of the invention, it will now become apparent to one of skill in the art that other embodiments incorporating the concepts may be used. It is felt, therefore, that these embodiments should not be limited to disclosed embodiments but rather should be limited only the spirit and scope of the following claims.

What is claimed is:

1. In a networked system including network information server nodes, one of the network information server nodes dynamically electable as a master network information server node, a network information server node comprising:
   a first process for allowing dynamic election of the network information server node as the master network information server node, the first process receiving transmitted election criteria and comparing the received election criteria with stored election criteria;
   a second process for constructing a load table after the network information server node is elected as the master information network server node, the load table constructed by storing a plurality of network addresses and a plurality of load information corresponding to a respective one of said plurality of network addresses in a memory element; and
   a third process receiving client requests and responding to said client requests based on the constructed load table.

2. In a networked system including network information server nodes, one of the network information server nodes dynamically electable as a master network information server node, a network information server node comprising:
   a first process for allowing dynamic election of the network information server node as the master network information server node, the first process receiving transmitted election criteria and comparing the received election criteria with stored election criteria;
   a second process for constructing a load table after the network information server mode is elected as the master network information server mode, the load table constructed by storing a plurality of network addresses and load information associated with each of said plurality of network addresses in a memory element; and
   a third process receiving client requests and responding to said client requests based on the constructed load table.

3. In a networked system including network information server nodes, one of the network information server nodes dynamically electable as a master network information server node, a network information server node comprising:
   a first process for allowing dynamic election of the network information server node as the master network information server node, the first process receiving transmitted election criteria and comparing the received election criteria with stored election criteria;
   a second process for constructing a load table after the network information server node is elected as the master network information server node, the load table constructed by storing an entry corresponding to a respective node in a memory element, each entry including:
      a network address of a respective one of said plurality of network nodes, and
      load information associated with said respective one of said plurality of network nodes;
   a third process receiving client requests and responding to each of said client requests with entries of said load table corresponding to network nodes which satisfy said each of said client requests.

4. A network comprising:
   at least two server nodes;
   a master network information server node in communication with said at least two server nodes, said master network information server node comprising a memory comprising a data table and at least one election criteria for allowing said network information server node to be dynamically selected, said data table having an entry for each of said at least two server nodes, each of said entries including:
      an address corresponding to a respective one of said at least two server nodes; and
      load information corresponding to said respective one of said at least two server nodes; and
   a client node in communication with said master network information server node and said at least two server nodes, said client node executing an application on one of said at least two server nodes in response to said load information obtained from said master network information server node.

5. The network of claim 4 further comprising a plurality of client nodes in communication with said master network information server node.

6. The network of claim 4 further comprising at least two network information server nodes wherein one of said at least two network information server nodes is a master network information server node.

7. The network of claim 4 wherein said at least two server nodes are grouped into clusters.

8. The network of claim 6 wherein one of said at least two network information server nodes is a gateway node.

9. The network of claim 8 wherein said gateway node is a master network information server node.

10. The network of claim 6 wherein said master network information server node is elected by an election process comprising the steps of:
    broadcasting an election datagram to said at least two network information server nodes, said election datagram comprising election criteria; and
    electing a master network information server node in response to said election criteria.

11. The network of claim 6 wherein said master network information server node broadcasts a declare datagram to detect multiple master network information server nodes using the same transport protocol.

12. The network of claim 4 comprising a second network information server node having a different network transport protocol from said first network information server node, wherein each of said network information server nodes is a master network information server node.

13. The election process of claim 10 wherein said election process occurs after an event selected from the group of events consisting of a system reboot, a master network information server node failing to respond with an acknowledge after being sent a server update datagram, a master network information server node failing to respond to a client request, at least two master network information server nodes configured with the same transport being detected, and a new server node appearing on said network.

14. The network information server node of claim 1 wherein said first process, said second process, and said third process comprise a single process.

15. The network information server node of claim 2 wherein said first process, said second process, and said third process comprise a single process.

16. The network information server node of claim 3 wherein said first process, said second process, and said third process comprise a single process.

* * * * *